US012506256B2

(12) United States Patent
Ren et al.

(10) Patent No.: US 12,506,256 B2
(45) Date of Patent: Dec. 23, 2025

(54) APPARATUSES WITH SLOT ANTENNAS

(71) Applicant: Anhui Huami Health Technology Co., Ltd., Anhui FTZ (CN)

(72) Inventors: Zhouyou Ren, Anhui FTZ (CN); Anping Zhao, Anhui FTZ (CN); Mingyang Li, Anhui FTZ (CN)

(73) Assignee: Anhui Huami Health Technology Co., Ltd., Anhui FTZ (CN)

( * ) Notice: Subject to any disclaimer, the term of this patent is extended or adjusted under 35 U.S.C. 154(b) by 123 days.

(21) Appl. No.: 18/316,760

(22) Filed: May 12, 2023

(65) Prior Publication Data

US 2023/0282967 A1 Sep. 7, 2023

Related U.S. Application Data

(63) Continuation of application No. PCT/CN2021/122557, filed on Oct. 8, 2021.

(30) Foreign Application Priority Data

Nov. 25, 2020 (CN) ......................... 202011345510.4
Nov. 25, 2020 (CN) ......................... 202022761117.5

(51) Int. Cl.
*H01Q 1/27* (2006.01)
*G04G 17/04* (2006.01)
(Continued)

(52) U.S. Cl.
CPC ............ *H01Q 1/273* (2013.01); *G04G 17/04* (2013.01); *H01Q 1/48* (2013.01); *H01Q 5/328* (2015.01); *H01Q 13/103* (2013.01)

(58) Field of Classification Search
CPC .......... H01Q 1/273; H01Q 1/48; H01Q 5/328; H01Q 13/103; H01Q 13/10
See application file for complete search history.

(56) References Cited

FOREIGN PATENT DOCUMENTS

CN 104701618 A * 6/2015 ............ H01Q 1/243
CN 104821428 A 8/2015
(Continued)

OTHER PUBLICATIONS

International Search Report and English Translation for International Application No. PCT/CN2021/122557 dated Dec. 14, 2021.

*Primary Examiner* — Hoang V Nguyen
(74) *Attorney, Agent, or Firm* — Young Basile Hanlon & MacFarlane, P.C.

(57) ABSTRACT

The present disclosure relates to the technical field of electronic devices, and provides an apparatus with a slot antenna, including: a radiation slot formed in the apparatus; a feeding terminal having one end connected to a feeding point of the slot antenna across the radiation slot, and the other end electrically connected to a radio-frequency circuit of the apparatus; a first inductor having one end connected to a grounding point of the slot antenna across the radiation slot, and the other end electrically connected to a grounding unit of the apparatus; and a first capacitor provided in the radiation slot and having two electrodes respectively connected to both ends of the radiation slot in a width direction, where the first capacitor is located between the feeding terminal and the first inductor in a length direction of the radiation slot.

20 Claims, 11 Drawing Sheets

(51) Int. Cl.
*H01Q 1/48* (2006.01)
*H01Q 5/328* (2015.01)
*H01Q 13/10* (2006.01)

(56) References Cited

FOREIGN PATENT DOCUMENTS

| | | | | | |
|---|---|---|---|---|---|
| CN | 107611618 | A | * | 1/2018 | ............. H01Q 13/10 |
| CN | 110544815 | A | | 12/2019 | |
| CN | 111613893 | A | * | 9/2020 | ............. G04R 60/06 |
| CN | 112490634 | A | | 3/2021 | |
| CN | 213425185 | U | | 6/2021 | |
| WO | 2016165113 | A1 | | 10/2016 | |

* cited by examiner

APPARATUSES WITH SLOT ANTENNAS

CROSS-REFERENCE TO RELATED APPLICATION(S)

The present application disclosure is a continuation of PCT/CN2021/122557, filed Oct. 8, 2021, which claims priority and benefit of Chinese Patent Application Nos. 202011345510.4 and 202022761117.5, filed on Nov. 25, 2020, the entire contents of all of which are incorporated herein by reference.

TECHNICAL FIELD

The present disclosure relates to the technical field of electronic devices, and in particular to an apparatus with a slot antenna.

BACKGROUND

With the development of electronic devices, smart wearable devices can achieve more and more functions. Taking a smartwatch as an example, it has functions such as motion assistance, satellite positioning, wireless connection, and communication, all of which can be achieved by means of a built-in antenna of the watch.

In order to pursue the aesthetics and texture of the appearance, more and more smart wearable devices are made of metal materials, while achieving antenna functions by using slot antenna structures. For wearable devices, they often have small sizes, and thus have limited design space for antennas, making them difficult to implement antennas with multiple frequency bands. Taking smartwatches as an example, due to the size limitation, it is difficult to implement dual-band GPS antenna design by using a slot antenna in the related art.

SUMMARY

In order to solve the technical problem of designing a multi-band antenna for an electronic device, embodiments of the present disclosure provide an apparatus with a slot antenna.

Embodiments of the present disclosure provide an apparatus with a slot antenna, including:

a radiation slot formed in the apparatus;

a feeding terminal having one end connected to a feeding point of the slot antenna across the radiation slot, and the other end electrically connected to a radio-frequency circuit of the apparatus;

a first inductor having one end connected to a grounding point of the slot antenna across the radiation slot, and the other end electrically connected to a grounding unit of the apparatus; and a first capacitor provided in the radiation slot and having two electrodes respectively connected to both ends of the radiation slot in a width direction, where the first capacitor is located between the feeding terminal and the first inductor in a length direction of the radiation slot.

In some embodiments, an operating frequency of the slot antenna includes at least two orders of resonant frequencies, and the first capacitor and the first inductor are configured to adjust at least one order of resonant frequency of the operating frequency.

In some embodiments, an operating frequency of the slot antenna includes a first resonant frequency and a second resonant frequency, the first resonant frequency being a second-order resonant frequency of the slot antenna, and the second resonant frequency being a third-order resonant frequency of the slot antenna.

In some embodiments, an operating frequency of the slot antenna includes a first resonant frequency and a second resonant frequency, a frequency band of the first resonant frequency including an L5 frequency band of a GPS satellite positioning system, and a frequency band of the second resonant frequency including an L1 frequency band of the GPS satellite positioning system.

In some embodiments, the operating frequency of the slot antenna further includes a third resonant frequency, a frequency band of the third resonant frequency including a Bluetooth/WiFi operating frequency band.

In some embodiments, the third resonant frequency is a fourth-order resonant frequency of the slot antenna.

In some embodiments, an operating frequency of the slot antenna includes two orders of resonant frequencies, and the first capacitor is located at a position where a voltage value at one order of resonant frequency is zero and a voltage value at the other order of resonant frequency is nonzero in the length direction of the radiation slot.

In some embodiments, the first capacitor is located at a position where a voltage value at the second resonant frequency is zero and a voltage value at the first resonant frequency is nonzero in the length direction of the radiation slot.

In some embodiments, the slot antenna is a half-wavelength slot antenna.

In some embodiments, the apparatus further includes a mainboard including the grounding unit and the radio-frequency circuit.

In some embodiments, the apparatus further includes a first conductor arranged opposite to the mainboard, where a gap between the first conductor and the mainboard forms the radiation slot.

In some embodiments, the apparatus further includes a second conductor electrically connected to the grounding unit, and the radiation slot is provided on the second conductor.

In some embodiments, the apparatus is a mobile terminal.

In some embodiments, the apparatus includes a conductive middle frame, where the conductive middle frame forms the first conductor, and is arranged around an outer side of the mainboard, and a gap between the middle frame and the mainboard forms the radiation slot.

In some embodiments, the apparatus includes a conductive housing, where the housing forms the second conductor, the mainboard is provided inside the housing, a grounding unit of the mainboard is electrically connected to the housing, and the radiation slot is provided on the housing.

In some embodiments, the mobile terminal includes a wrist-worn device.

The apparatus according to the embodiments of the present disclosure includes the slot formed in the apparatus. The feeding terminal and the first inductor are both connected to both ends of the slot in the length direction. The feeding terminal is connected to the radio-frequency circuit of the apparatus to form an excitation source of an antenna. The first inductor is connected to the grounding unit of the apparatus, that is, the antenna is grounded via the first inductor, such that an effective electrical length of the slot antenna is increased, and the required length of the slot is shorter for realizing the antenna with a same operating frequency, thereby reducing the space in the apparatus occupied by the antenna slot. The first capacitor is provided between the feeding terminal and the first inductor. A frequency multiplication relationship among the multiple orders of resonant frequencies can be adjusted by adjusting a position of the first capacitor in an area of a voltage distribution relationship at the multiple orders of the resonant frequencies, so as to adjust the multiple orders of the resonant frequencies to available operating frequencies, and to meet the requirements of multiple operating frequencies with a single antenna structure.

BRIEF DESCRIPTION OF DRAWINGS

In order to explain technical solutions in DETAILED DESCRIPTION OF THE EMBODIMENTS of the present disclosure or in the related art more clearly, the drawings to be used in the DETAILED DESCRIPTION or description of the related art will be briefly introduced below. It is apparent that the drawings in the following description illustrate some embodiments of the present disclosure. For those ordinary skilled in the art, other drawings can be obtained from these drawings without much creative effort.

DETAILED DESCRIPTION

Figure 1:
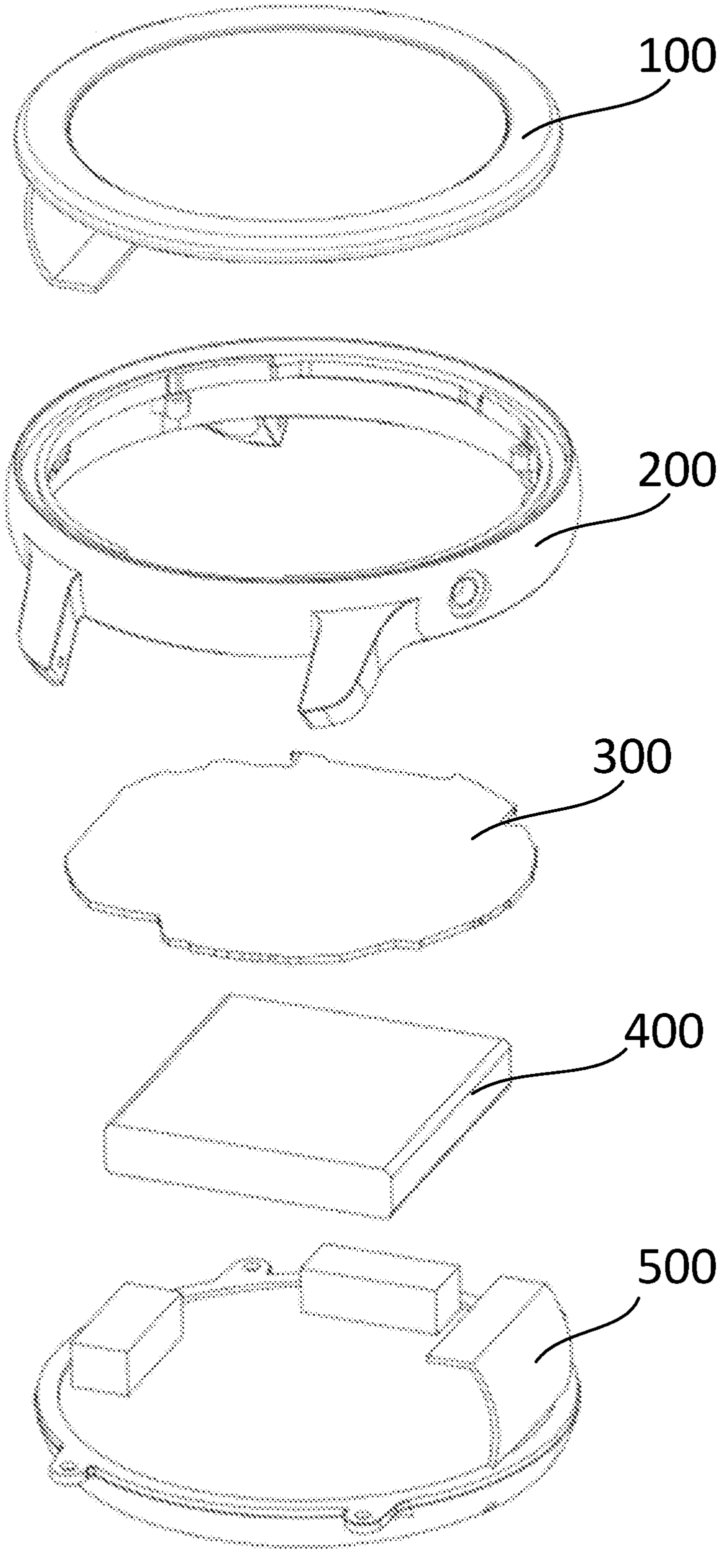
FIG. 1 is an exploded view illustrating a structure of a terminal device according to some embodiments of the present disclosure.

Technical solutions of the present disclosure will be clearly and completely described below in conjunction with the accompanying drawings. It is apparent that the described embodiments are part of the embodiments of the present disclosure, rather than all of the embodiments. All other embodiments obtained by those ordinary skilled in the art based on the embodiments of the present disclosure without any creative efforts shall fall within the protection scope of the present disclosure. In addition, technical features involved in different embodiments of the present disclosure described below can be combined with each other as long as they do not conflict with each other.

A slot antenna refers to an antenna formed by providing a slot on a surface of a conductor. For a typical slot antenna, such as, for example, a strip-shaped slot can be formed between a PCB (Printed Circuit Board) and a metal of the device, or, a strip-shaped slot can be provided on a metal housing, and a feeding terminal connected across the slot serves as an excitation source of the antenna.

The operating principle of the slot antenna is similar to that of a dipole antenna. Generally, a length of the slot is half of a wavelength ("half-wavelength") corresponding to a first-order resonant frequency of the antenna, that is, the relationship between a slot length L of the slot antenna and the wavelength A corresponding to an operating frequency of the antenna is as follows:

$$L = \frac{1}{2}\lambda = \frac{1}{2} \cdot \frac{C}{f} \quad (1)$$

In Equation (1), C represents the speed of light, and f represents the first-order resonant frequency. It can be seen from the Equation (1) that, the length L of the slot is inversely proportional to the operating frequency f of the antenna, that is, the lower the operating frequency of the antenna, the longer the required length of the slot.

Taking the GPS satellite positioning system as an example, frequency bands of the GPS satellite positioning system for civil use include L1 frequency band and L5 frequency band. The center frequency of the L1 frequency band is 1.575 GHz, and the center frequency of the L5 frequency band is 1.176 GHz. Since the satellite coverage of the L1 frequency band is larger, the L1 frequency band usually serves as the fundamental GPS operating frequency band, and a single-band GPS antenna refers to an antenna that supports only the L1 frequency band. A dual-band GPS antenna supports both the L1 frequency band and the L5 frequency band, with the L1 frequency band serving as the fundamental frequency band, and the L5 frequency band serving as the auxiliary frequency band, such that ionospheric errors can be eliminated, and the positioning accuracy can be greatly improved.

It can be seen from the calculation of the Equation (1) that, half of the L1 wavelength of the GPS satellite positioning system in free space is about 95 mm, and half of the L5 wavelength of the GPS satellite positioning system in free space is about 127 mm. For some terminal devices, such as typical smartwatches, due to the limited space in the watches, it is impossible to make the slot antennas in the watches covering both the L1 frequency band and the L5 frequency band of the GPS, and Bluetooth/WiFi antennas are always required for the wearable devices, which further compress the internal space of the devices. As a result, it is difficult to realize dual-band GPS satellite positioning systems in some terminal devices, resulting in low positioning accuracy of the devices.

In order to solve the above technical problems, embodiments of the present disclosure provide an apparatus with a slot antenna. The apparatus can be any device with a slot antenna structure, e.g., a handheld device such as a smart phone or a tablet computer, or a wrist-worn device such as a smartwatch or a smart bracelet, and so on, which is not limited in the present disclosure. The apparatus according to the embodiments of the present disclosure aims to achieve dual-frequency or multi-frequency multiplexing by utilizing multiple orders of the resonant frequencies of the slot antenna, and can realize a multi-band antenna structure in the apparatus with a relatively small space, such as, for example, the design of a dual-band GPS antenna in the volume of a smart watch or bracelet. Therefore, the apparatus according to the present disclosure has a better performance in a terminal device with a relatively small size, such as a wrist-worn device. However, the apparatus according to the present disclosure is also applicable to any other device with a slot antenna, and can have similar effect, which is not limited by the present disclosure.

In some embodiments, the present disclosure provides an apparatus with a slot antenna, including: a slot formed in the apparatus, and a feeding terminal and a first inductor both bridged across the slot. The slot can be a gap formed between a mainboard and a metal middle frame of the apparatus, or a gap provided on a metal housing of the apparatus, and the present disclosure is not limited thereto.

One end of the feeding terminal is connected to a feeding point of the antenna across the slot, and the other end of the feeding terminal is connected to a radio-frequency circuit on the mainboard of the apparatus, such that the feeding terminal serves as an excitation source of the antenna. One end of the first inductor is connected to a grounding point of the antenna across the slot, and the other end of the first inductor is connected to a grounding unit of the mainboard of the apparatus, such that the first inductor serves as a grounding terminal of the antenna. That is, a gap between the feeding terminal and the first inductor serves as a radiation slot of the antenna. A first capacitor is provided between the feeding terminal and the first inductor in a length direction of the slot, and electrodes at two ends of the first capacitor are connected to two ends of the slot in a width direction, respectively. At least one order of the resonant frequencies of the antenna is adjusted with the first capacitor and the first inductor.

According to the embodiments of the present disclosure, the first capacitor and the first inductor are added to the slot antenna, and a frequency multiplication relationship among the multiple orders of the resonant frequencies of the slot antenna is adjusted, such that the multiple orders of the resonant frequencies are adjusted to available operating frequencies, and requirements of multiple operating frequency bands can be met with a single antenna structure.

Based on the principle of the slot antenna, when the slot antenna is fed via the feeding terminal, the slot antenna can generate the multiple orders of resonant frequencies having a frequency multiplication relationship thereamong. For a single-band antenna, the first-order resonant mode (also referred to as "fundamental mode") of the multiple orders of resonant frequencies is available. The "multi-band antenna" described in the present disclosure refers to utilizing two or more orders of resonant frequencies of a same slot antenna structure.

For example, for the same slot antenna, if one order of the resonant frequencies is 1.176 GHz and another order of the resonant frequencies is 1.575 GHz, the antenna covers both the L1 frequency band and the L5 frequency band of the GPS. However, it can be seen from the foregoing that, the multiple orders of resonant frequencies of the slot antenna have the frequency multiplication relationship thereamong. Taking the first three orders of the resonant frequencies as an example, if the first-order resonant frequency is $f_0$, the second-order resonant frequency is $2f_0$, and the third-order resonant frequency is $3f_0$, this makes it impossible to directly use the multiple orders of resonant frequencies in most cases. For example, if the first-order resonant frequency of the slot antenna is 1.176 GHz, the second-order resonant frequency reaches 2.352 GHz, which is much higher than the center frequency 1.575 GHz of the L1 frequency band of the GPS.

Based on the above discussion, in the embodiments of the present disclosure, the first capacitor and the first inductor are used to adjust the frequency multiplication relationship among the multiple orders of resonant frequencies of the slot antenna, so as to achieve the desired target frequencies. The use of a same antenna structure to realize a multi-band antenna greatly simplifies the structure of antenna in the apparatus, which will make it possible to implement antenna structures that were previously impossible to achieve in devices with relatively small sizes.

In order to facilitate a more intuitive understanding of the present disclosure, the present disclosure will be described below in conjunction with a particular embodiment. In this embodiment, a smartwatch is used as an example of the apparatus, and the slot antenna is used to realize a dual-band GPS antenna as an example. It can be seen from the foregoing that, it is difficult to implement a dual-band GPS antenna by using a slot antenna structure due to the limited space in the smartwatch, and this embodiment is directed to the design of the dual-band GPS antenna in the smartwatch.

Figure 2:
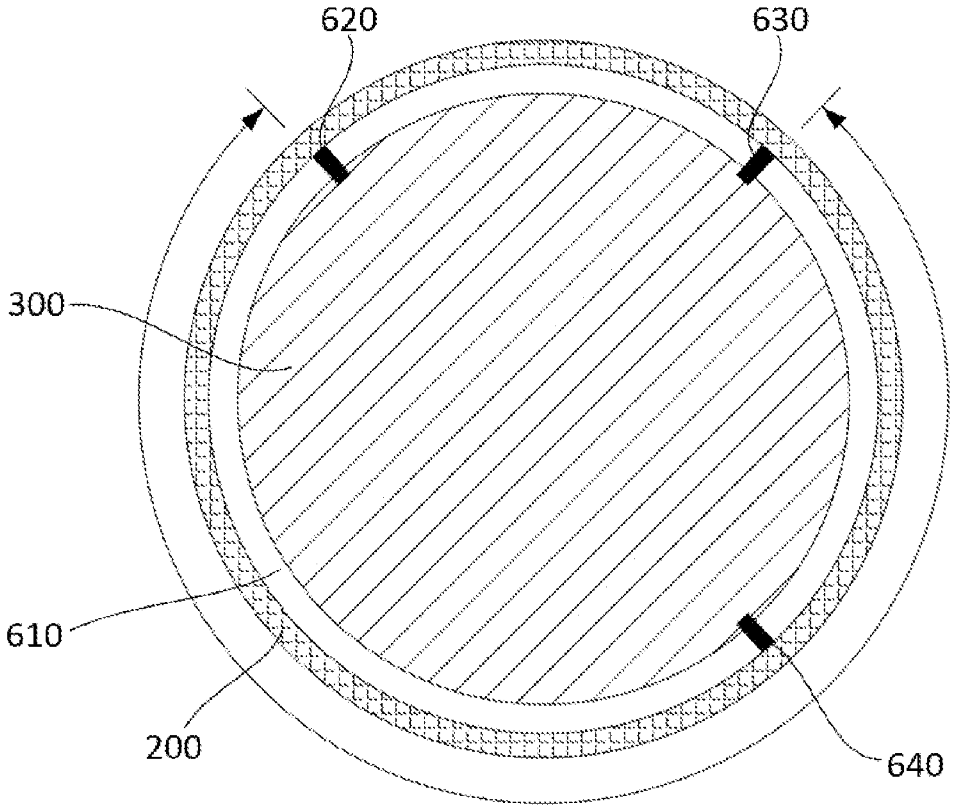
FIG. 2 is a schematic diagram illustrating a dual-band slot antenna according to some embodiments of the present disclosure.

As shown in FIG. 1, the apparatus can be a smartwatch in the present embodiment, which includes a screen assembly 100, a metal middle frame 200, a mainboard 300, a battery 400, and a bottom case 500. In the present embodiment, a slot antenna is formed by feeding and grounding a slot between the mainboard 300 and the metal middle frame 200. FIG. 2 shows a schematic diagram of the structure of the slot antenna in the present embodiment. In particular, as shown in FIG. 2, an annular slot 610 is formed between the mainboard 300 and the metal middle frame 200. A feeding terminal 620 is connected across the annular slot 610, with one end connected to the metal middle frame 200 as a feeding point, and the other end connected to a radio-frequency (RF) circuit on the mainboard 300. A first inductor 630 is connected across the annular slot 610, one end of the first inductor 630 is connected to the metal middle frame 200 as a grounding point, and the other end of the first inductor 630 is connected to a grounding unit of the mainboard 300. Thus, a slot antenna structure is formed between the feeding terminal 620 and the first inductor 630. It should be noted that the grounding unit of the apparatus in this embodiment refers to a PCB board of the mainboard 300, and the PCB board is the ground of the whole system, which can be understood by those skilled in the art.

It can be understood that, in this embodiment, instead of being grounded directly at the grounding point of the antenna, the antenna is grounded through the first inductor 630. According to the aforementioned principle of the slot antenna, grounding the antenna through the first inductor 630 is equivalent to increasing the effective electrical length of the antenna, such that the resonant frequency of the slot antenna is shifted towards lower frequencies.

With continued reference to FIG. 2, a first capacitor 640 is connected across the annular slot 610, an electrode on one end of the first capacitor 640 is connected to the metal middle frame 200, and an electrode on the other end of the first capacitor 640 is connected to the grounding unit of the mainboard 300. The effective electrical length of the antenna can also be increased by providing a capacitor in the slot antenna, such that the resonant frequency of the slot antenna is shifted towards lower frequencies.

On this basis, how to adjust two orders of resonant frequencies of the slot antenna to the center frequency of the L1 frequency band of the GPS and the center frequency of the L5 frequency band of the GPS are illustrated. For example, two orders of resonant frequencies of the slot antenna include a first resonant frequency and a second resonant frequency.

First, considering that the center frequency of the L1 frequency band of the GPS is 1.575 GHz and the center frequency of the L5 frequency band of the GPS is 1.176 GHz, the frequency multiplication relationship between these two center frequencies is that the center frequency of the L1 frequency band is about 1.34 times of the center frequency of the L5 frequency band. Based on the foregoing, it can be seen that the first three orders of resonant frequencies of the slot antenna are $f_0$, $2f_0$, and $3f_0$, respectively, where the frequency multiplication relationship between the second-order resonant frequency and the third-order resonant frequency is that the third-order resonant frequency is 1.5 times of the second-order resonant frequency, which is closer to the frequency multiplication relationship between the L1 frequency band and the L5 frequency band. Therefore, in the present embodiment, the second-order resonant frequency and the third-order resonant frequency of the slot antenna are used to realize the dual-band GPS antenna. For ease of description, the second-order resonant frequency of the slot antenna is served as the first resonant frequency, and the third-order resonant frequency of the slot antenna is served as the second resonant frequency hereinafter.

In the embodiments of the present disclosure, the second-order resonant frequency and the third-order resonant frequency can be adjusted on the basis of the first three orders of resonant frequencies, so as to realize the dual-band GPS antenna. However, it should be understood by those skilled in the art that, on the basis of the descriptions of the present disclosure, in other implementation scenarios, the solution provided in the present disclosure can theoretically realize the adjustment of any two or more orders of resonant frequencies, without being limited to the examples described in the embodiments of the present disclosure, which will not be described in detail herein.

Figure 3:
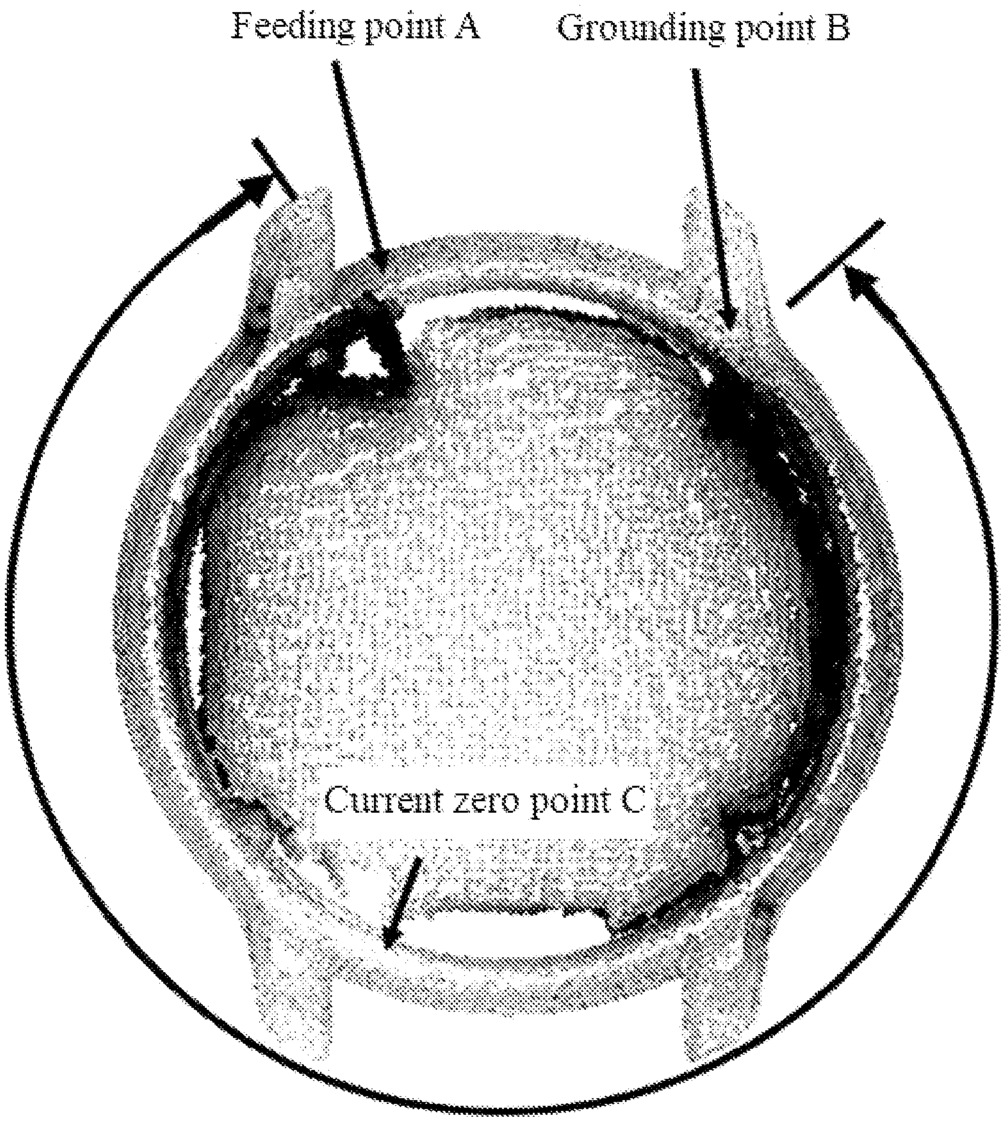
FIG. 3 is a schematic diagram illustrating a current distribution of an antenna at a first-order resonant frequency according to some embodiments of the present disclosure.
Figure 4:
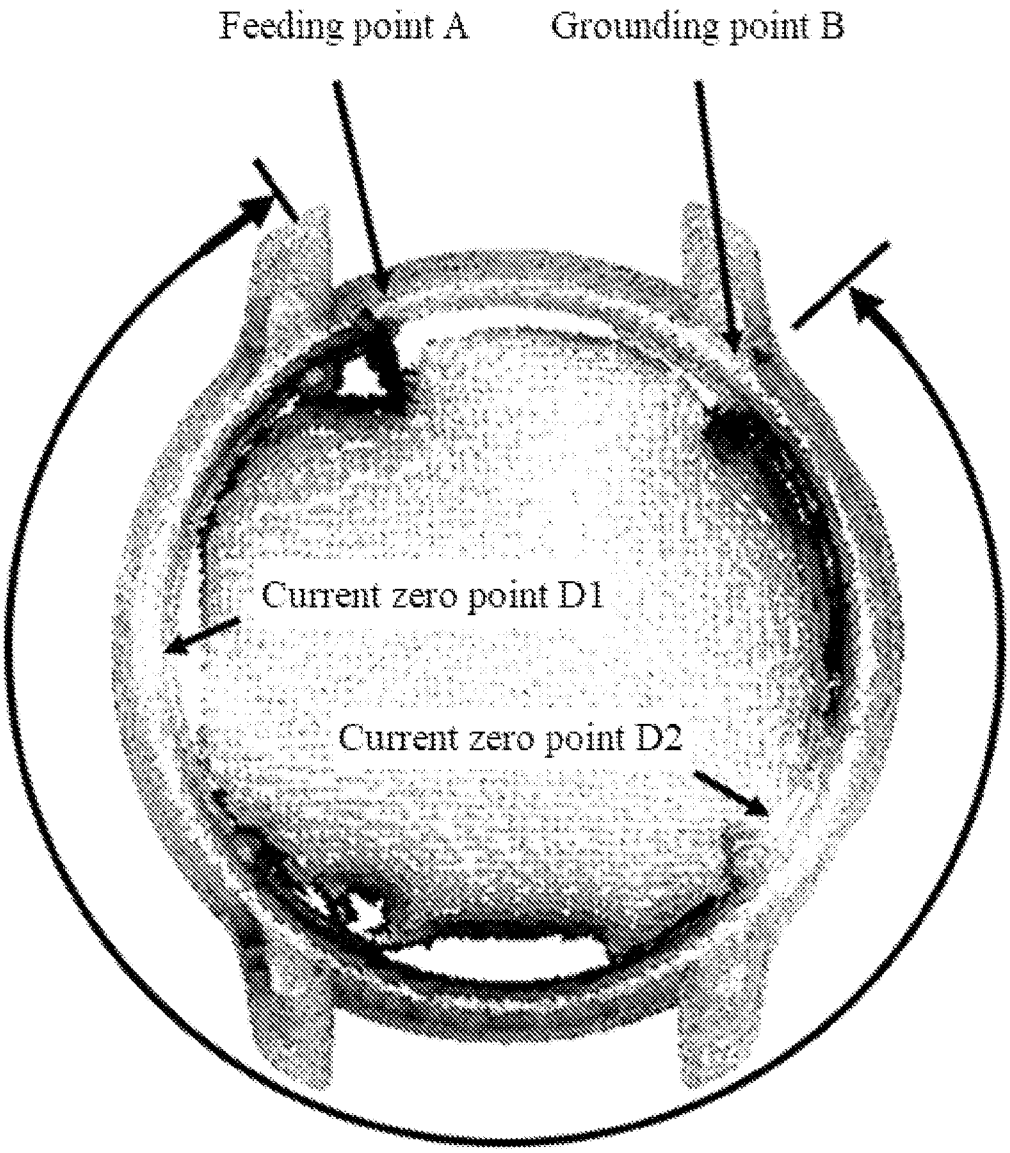
FIG. 4 is a schematic diagram illustrating a current distribution of an antenna at a second-order resonant frequency according to some embodiments of the present disclosure.
Figure 5:
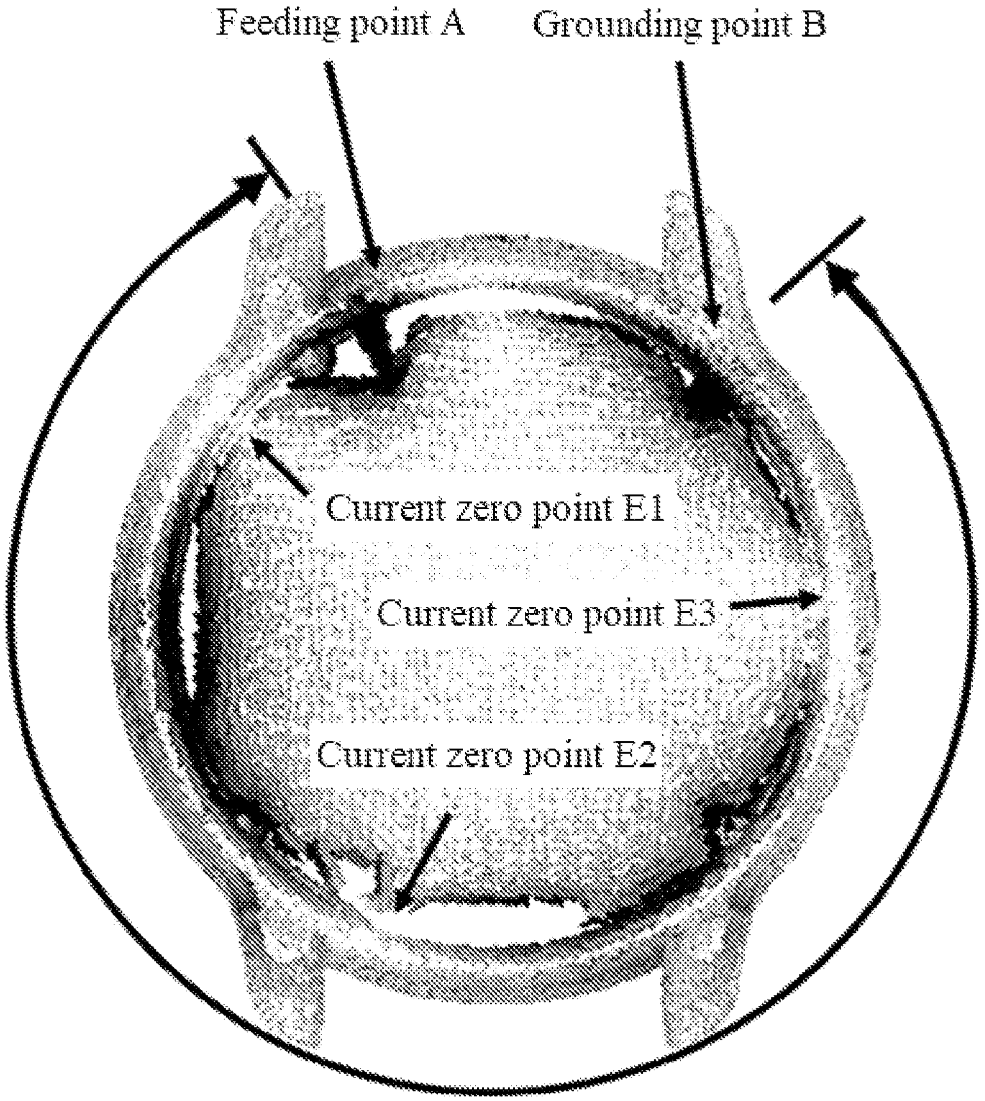
FIG. 5 is a schematic diagram illustrating a current distribution of an antenna at a third-order resonant frequency according to some embodiments of the present disclosure.

Next, the effect of the first capacitor 640 on the first resonant frequency and the second resonant frequency will be further illustrated on the basis of the foregoing. FIG. 3 to FIG. 5 show schematic diagrams of current distribution of an antenna at the first three orders of resonant frequencies in the case that the first capacitor 640 is not provided, in which darker colors indicate denser current distribution, and lighter colors indicate sparser current distribution.

FIG. 3 shows the current distribution of the slot antenna at the first-order resonant frequency. It can be seen that, the current density first gradually decreases in a direction from the feeding point A to the grounding point B, and after decreasing to zero at the point C, the current density gradually increases. That is, there is one zero point C of the current at the first-order resonant frequency. It should be noted that theoretically, if the annular slot 610 is a regular slot, the zero point C of the current at the first-order resonant frequency should be located near a midpoint of the slot. Since the mainboard 300 is in an irregular shape in this embodiment, the position of the zero point C of the current is slightly offset from the midpoint of the slot.

Similarly, FIG. 4 shows the current distribution of the slot antenna at the second-order resonant frequency. It can be seen that there are two zero points D1 and D2 of the current at the second-order resonant frequency. FIG. 5 shows the current distribution of the slot antenna at the third-order resonant frequency. It can be seen that there are three zero points E1, E2, and E3 of the current at the third-order resonant frequency. The current distributions in FIGS. 3 to 5 also demonstrate that the three orders of resonant frequencies have the frequency multiplication relationship of $f_0$, $2f_0$, and $3f_0$.

At the resonant frequency, the voltage distribution is opposite to the current distribution, that is, the zero position of the current corresponds to the peak of the voltage, and the peak position of the current is the zero positon of the voltage. According to the operating principle of the capacitor, the greater the difference between voltages applied to the two electrodes of the capacitor, the stronger the effect of the capacitor on reducing the resonant frequency. Accordingly, if the first capacitor 640 is provided at a position where the voltage value is zero at a certain order of resonant frequency, the first capacitor 640 has no effect on reducing that certain order of resonant frequency. In addition, the position of the first capacitor 640 should satisfy the following condition: the greater the voltage value at the position of the first capacitor 640, the greater the shift of that order of resonant frequency towards lower frequencies.

Based on the above description, when adjusting the first resonant frequency, it should be ensured that the second resonant frequency is not affected or is affected as little as possible. Therefore, in this embodiment, the first capacitor 640 is located at a position where the voltage is zero at the second resonant frequency and the voltage is nonzero at the first resonant frequency.

With continued reference to FIGS. 4 and 5, it can be seen that, the zero points D1 and D2 of the current at the first resonant frequency approximately correspond to the current peaks at the second resonant frequency, i.e., the zero points of the voltage at the second resonant frequency correspond to the zero points D1 and D2 of the current at the first resonant frequency, and therefore, the first capacitor 640 can be provided at one of D1 and D2.

Figure 6:
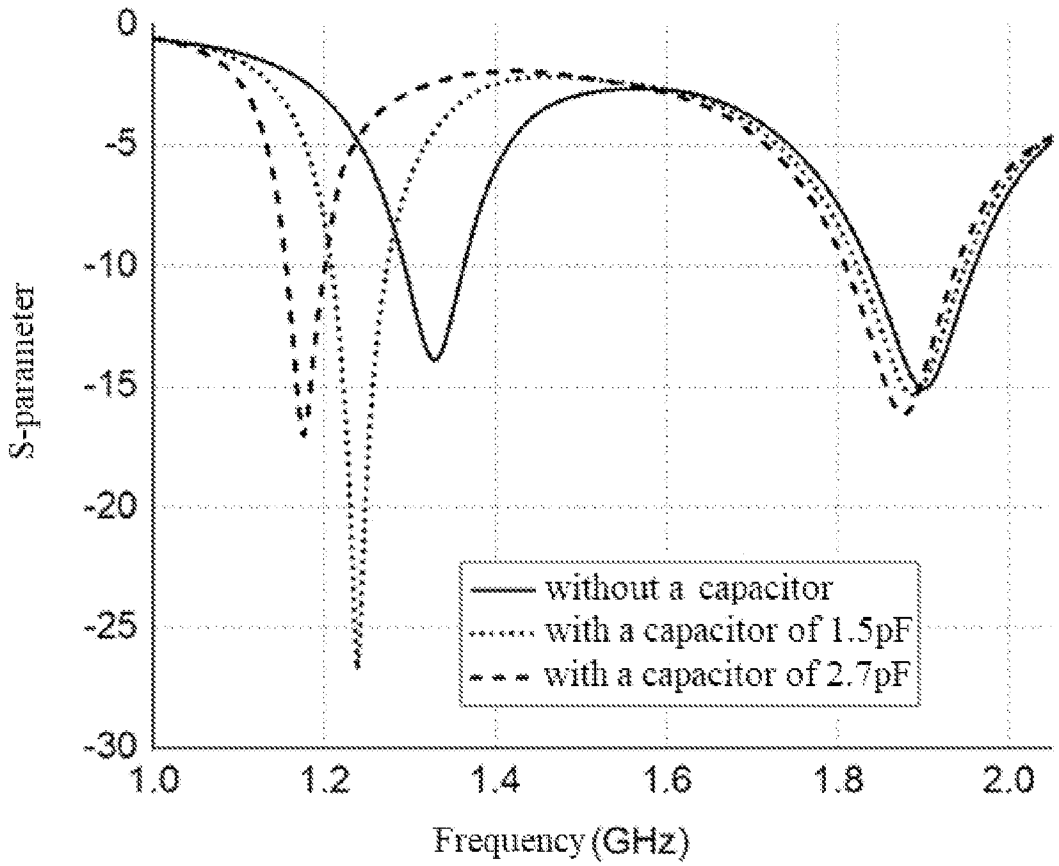
FIG. 6 is a graph illustrating a change in an S-parameter of an antenna with a first capacitor applied at a zero position of voltage.

FIG. 6 shows a graph of a change in an S-parameter (return loss) of the antenna with the first capacitor 640 provided at the position of D2. First, comparing the curves in the case that the first capacitor 640 is not provided and in the case that the first capacitor 640 of 1.5 pF is provided, it can be seen that the original value of the first resonant frequency of the antenna is about 1.32 GHz, and after the capacitor of 1.5 pF is provided at the position of D2, the first resonant frequency is shifted towards a lower frequency of about 1.25 GHz, while the second resonant frequency of the antenna is almost unchanged, which is in accordance with the above discussion.

Further, comparing the curves in the case that the capacitor of 1.5 pF is applied and in the case that the capacitor of 2.7 pF is applied, it can be seen that, the original value of the first resonant frequency of the antenna is about 1.32 GHz, the first resonant frequency is shifted towards a lower frequency of about 1.25 GHz after the capacitor of 1.5 pF is applied at the position of D2, and the first resonant frequency is shifted towards a lower frequency of about 1.18 GHz after the capacitor of 2.7 pF is applied at the position of D2, while the second resonant frequency of the antenna is almost unchanged. Meanwhile, it can be seen from FIG. 6 that the S-parameters of the antenna are all below −10 dB, which exhibits a good antenna performance and meets the requirements of the GPS satellite positioning system for the watch.

As can be seen from the above, when the first resonant frequency is adjusted with the first capacitor 640, the following conditions can be satisfied: the first capacitor 640 is provided at a selected location, e.g., near the zero point of the voltage at the second resonant frequency, such that the first resonant frequency is independently adjusted without affecting the second resonant frequency. The larger the capacitance value of the first capacitor 640, the greater the shift of the first resonant frequency towards lower frequencies. Based on these conditions, those skilled in the art can realize the adjustment of the first resonant frequency.

Next, the effect of the first inductor 630 on the resonant frequency of the antenna will be illustrated.

According to the aforementioned description, grounding the slot antenna through the first inductor 630 is equivalent to increasing the effective electrical length of the slot antenna, such that the multiple orders of the resonant frequencies of the antenna are shifted towards lower frequencies. On this basis, it is theoretically possible to design some dual-band slot antennas, and according to the present disclosure, further research we conducted shows that the first inductor 630 can also be used to achieve independent adjustment of the second resonant frequency, making it possible to realize the dual-band GPS antenna for the apparatus, which will be described in detail below.

First, it can be known from the foregoing that, the first resonant frequency can be independently adjusted with the first capacitor 640. Therefore, in some design of dual-band slot antennas, the second resonant frequency of the antenna is adjusted to the target frequency by applying the first inductor 630 to the ground, and then the first resonant frequency is independently adjusted to the target frequency with the first capacitor 640 based on the above description, so as to realize the dual-band slot antenna.

However, it is more difficult to realize the dual-band GPS antenna. For example, when the second resonant frequency is adjusted to around 1.575 GHz with the first inductor 630, it is possible that the first resonant frequency is already below 1.176 GHz, and the first capacitor 640 is used to shift the first resonant frequency towards lower frequencies, thus the dual-band GPS antenna cannot be realized. Based on this, further study has been conducted on the independent adjustment of the second resonant frequency with the first inductor 630, as discussed below.

Figure 7:
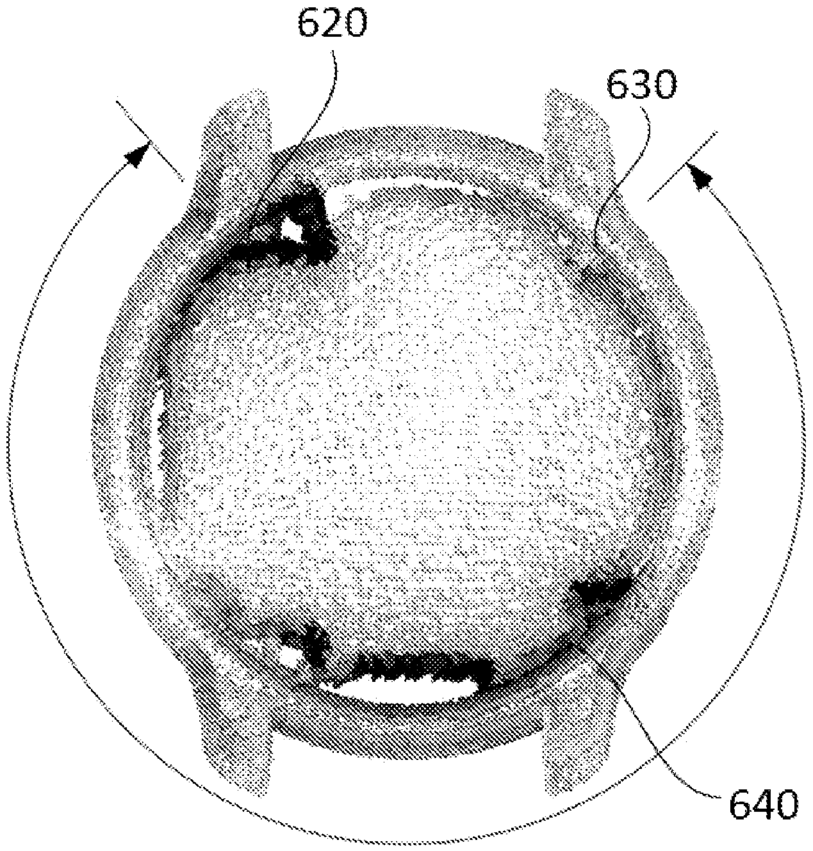
FIG. 7 is a schematic diagram illustrating a current distribution of an antenna at a second-order resonant frequency after a first capacitor is applied at a zero position of voltage.

FIG. 7 shows the current distribution at the first resonant frequency after the first capacitor 640 is applied at the position of D2. It can be seen that, the current distribution in the direction of the slot length from the feeding terminal 620 to the first capacitor 640 is the same as that described above, while there is almost no current distribution in the direction of the slot length from the first capacitor 640 to the first inductor 630. Our research has showed that, this is due to the fact that the application of the first capacitor 640 creates a cutoff of the current at the first resonant frequency, such that the current is concentrated in the slot on the left side of the first capacitor 640, and only a small amount of current passes through the slot on the right side of the first capacitor 640. As the capacitance value of the first capacitor 640 increases, the cutoff effect of the first capacitor 640 on the current at the first resonant frequency becomes more pronounced. Moreover, since the first capacitor 640 is located at the zero position of the voltage at the second resonant frequency, it does not affect the current distribution at the second resonant frequency.

On this basis, in the case that the first inductor 630 is changed, the first inductor 630 has little effect on the change of the first resonant frequency, because there is only a small amount of current distribution near the first inductor 630 at the first resonant frequency, and the first inductor 630 has less effect on the first resonant frequency as the capacitance value of the first capacitor 640 increases.

Figure 8:
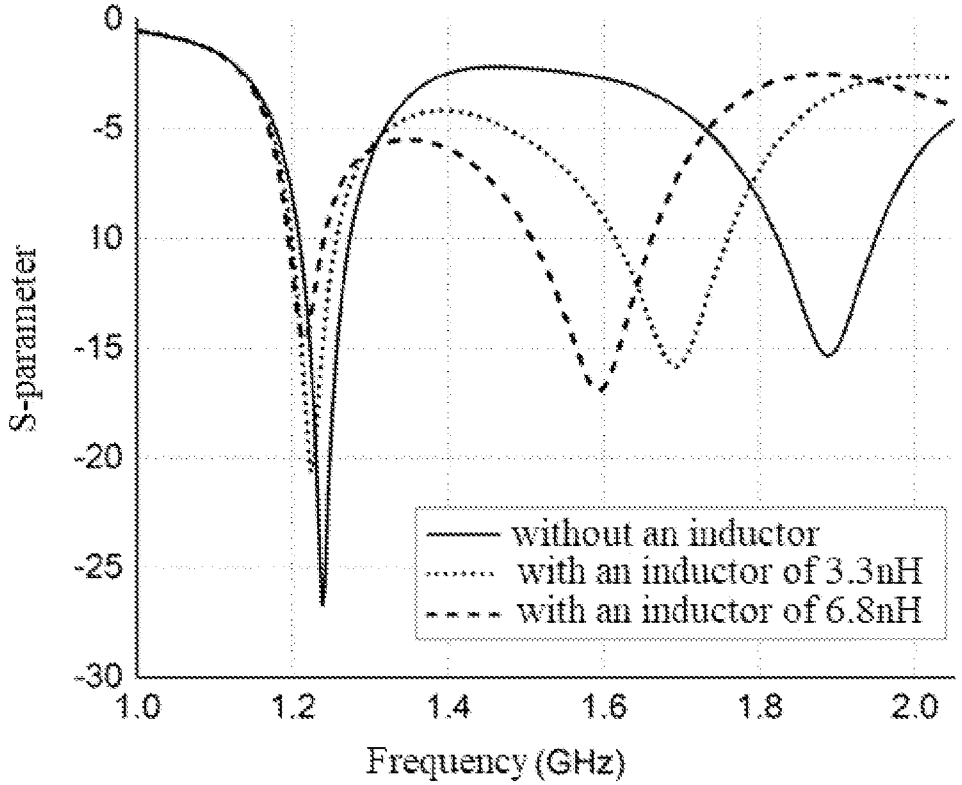
FIG. 8 is a graph illustrating a change in an S-parameter of an antenna with a first inductance after a first capacitor is applied.

FIG. 8 shows a graph of the change in the S-parameter of the antenna by the first inductor 630 in the case that the first capacitor 640 of 1.5 pF is provided at the position of D2. Comparing the curves in the case that an inductor is not provided and in the case that the inductor of 3.3 nH is provided, it can be seen that the second resonant frequency is about 1.9 GHz in the case that the antenna is not grounded through the first inductor 630, while the second resonant frequency is shifted towards lower frequencies to about 1.7 GHz in the case that the first inductor 630 of 3.3 nH is provided, and the first resonant frequency does not change significantly.

Furthermore, the curves in the case that the inductor of 3.3 nH is applied and in the case that the inductor of 6.8 nH is applied show that, the second resonant frequency is shifted towards lower frequencies to about 1.7 GHz in the case that the first inductor 630 of 3.3 nH is applied, while the second resonant frequency is shifted towards lower frequencies to about 1.6 GHz in the case that the first inductor 630 of 6.8 nH is applied, and there is no significant change in the first resonant frequency. Moreover, as shown in FIG. 8, the S-parameters of the antenna are all below −10 dB, which exhibits a good antenna performance and meets the requirements of the GPS satellite positioning system for the watch.

As can be seen from the above, when the second resonant frequency is adjusted with the first inductor 630, the following conditions can be satisfied: the first capacitor 640 is provided near the zero point of the voltage at the second resonant frequency, and the second resonant frequency can be independently adjusted by means of grounding through the first inductor 630, without affecting the first resonant frequency. The larger the inductance value of the first inductor 630, the greater the shift of the second resonant frequency towards lower frequencies. Based on the guidance of these descriptions, those skilled in the art can realize the adjustment of the second resonant frequency.

Based on the above, it can be understood that the implementation of adjusting the first resonant frequency and the second resonant frequency of the antenna through the first capacitor 640 and the first inductor 630. The design of the dual-band GPS antenna will be described with reference to some nonlimiting examples below.

Firstly, a typical slot antenna structure is designed in the allowable space of the watch, such that the second-order resonant frequency of the slot antenna structure is as close as possible to and greater than 1.176 GHz, and the third-order resonant frequency is as close as possible to and greater than 1.575 GHz. Then, the first capacitor 640 is applied at the zero point of the voltage at the third-order resonant frequency, and the center frequency of the second-order resonance is adjusted to around 1.176 GHz by adjusting the position and the capacitance value of the first capacitor 640. The antenna is grounded through the first inductor 630 at the grounding point of the antenna, and the center frequency of the third-order resonance is adjusted to around 1.575 GHz by adjusting the inductance value of the first inductor 630, so as to realize the dual-band GPS slot antenna.

Figure 9:
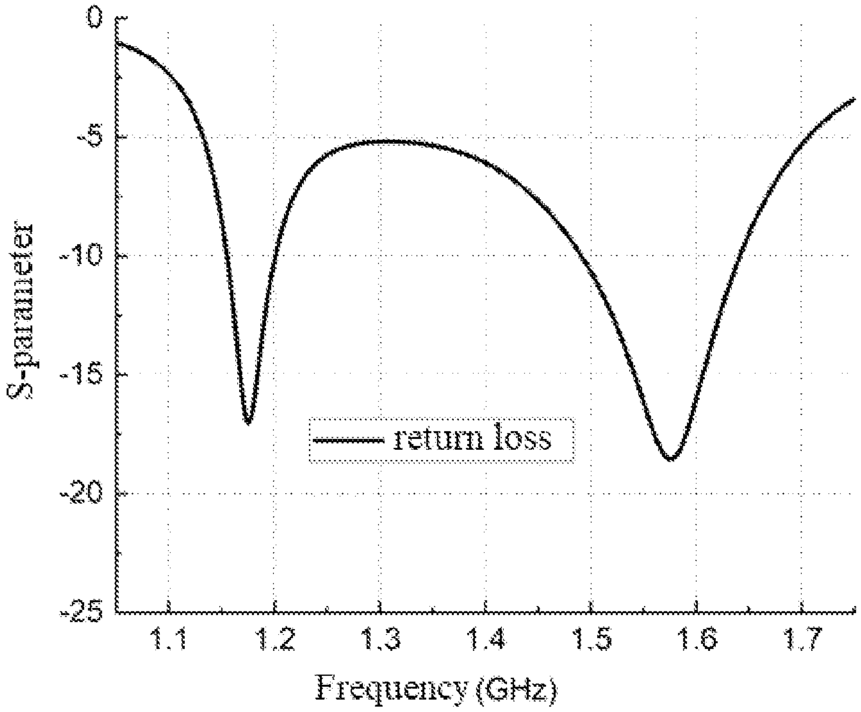
FIG. 9 is a graph illustrating an S-parameter of an antenna according to an embodiment of the present disclosure.
Figure 10:
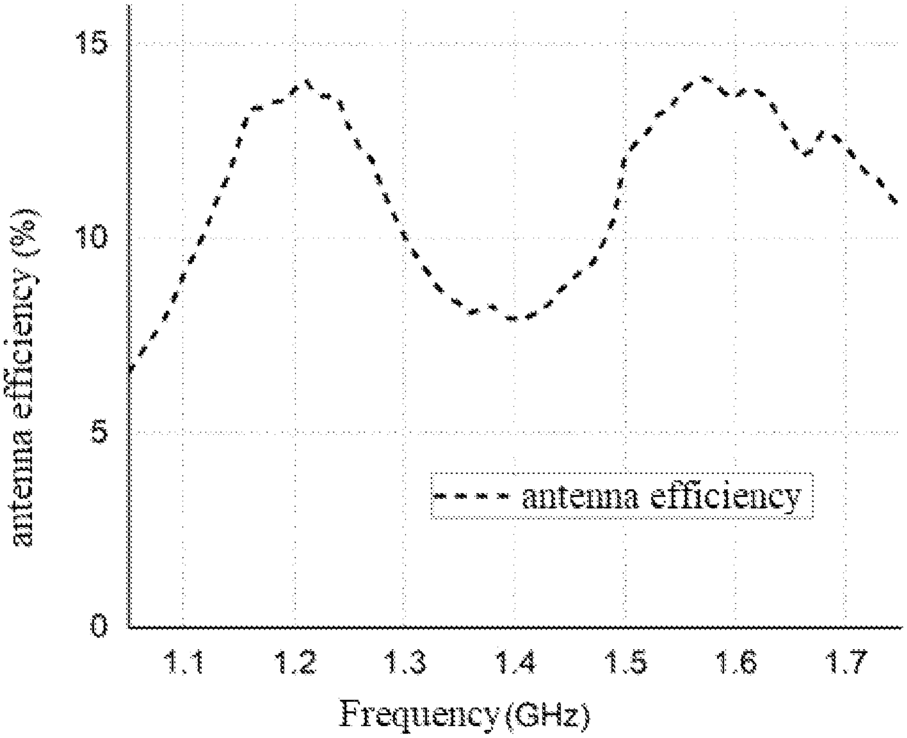
FIG. 10 is a graph illustrating an efficiency of an antenna according to an embodiment of the present disclosure.

FIG. 9 shows a graph of the S-parameter of the dual-band GPS slot antenna in this example. As shown in FIG. 9, the first resonant frequency of the antenna structure in this example covers the L5 frequency band of the GPS from 1.150 GHz to 1.2 GHz, and the second resonant frequency covers the L1 frequency band of the GPS from 1.560 GHz to 1.620 GHz, where the antenna has a good return loss. FIG.

10 shows a graph of the efficiency of the antenna in this example. It can be seen that the total efficiency of the antenna in this example is greater than 13% in both of the above frequency bands of the GPS, which can meet the requirements for the performance of dual-band GPS antennas in wearable devices.

As can be seen from the above, the apparatus with the slot antenna in this embodiment adjusts two orders of resonant frequencies of the antenna with the first capacitor and the first inductor, respectively, such that the requirements of the dual-band GPS antenna can be met by using a same antenna structure. Meanwhile, the dual-band GPS antenna is realized by using the second-order resonant frequency and the third-order resonant frequency of which the frequency multiplication relationship is closer to each other, which is more conducive to the design of the dual-band GPS antenna.

In the above embodiment, the structure and implementations of the slot antenna according to the present disclosure have been described by using the dual-band GPS antenna as an example. It should be understood that, however, the slot antenna according to the present disclosure is not limited to the dual-band antenna, and an antenna operating at more orders of resonant frequencies can be realized.

In some embodiments, still taking the aforementioned smartwatch as an example, the smartwatch often needs to establish a communication connection with a smart phone through Bluetooth or WiFi, and thus a Bluetooth/WiFi antenna, that is, an antenna with an operating frequency band adapted for Bluetooth or Wifi communications, is needed. In this embodiment, it is considered that the center frequency of the Bluetooth/WiFi antenna is 2.4 GHz, which is approximately twice the center frequency of the L5 frequency band of the GPS, and a fourth-order resonant frequency of the slot antenna is exactly twice the second-order resonant frequency.

Therefore, in addition to the first resonant frequency and the second resonant frequency described above, the slot antenna of the watch includes a third resonant frequency in the embodiment of the present disclosure, and the third resonant frequency is optionally the fourth-order resonant frequency of the slot antenna. That is, the operating frequencies of the slot antenna include: the L5 frequency band of the GPS realized with the first resonant frequency, the L1 frequency band of the GPS realized with the second resonant frequency, and the Bluetooth/WiFi frequency band realized with the third resonant frequency. Therefore, for the smartwatch, the dual-band GPS antenna and the Bluetooth/WiFi antenna can be realized by using a same slot antenna structure without providing another separate Bluetooth/WiFi antenna, and it can be realized by connecting an RF circuit of the Bluetooth/WiFi antenna to the dual-band GPS antenna through a combiner, which simplifies the internal stacking design of the watch.

The apparatus in the present disclosure realizes the adjustment of two orders or multiple orders of the resonant frequencies through the first capacitor and the first inductor, thereby realizing a dual-band GPS slot antenna, or a dual-band GPS and Bluetooth/WiFi slot antenna. Based on the description, those skilled in the art can understand that the embodiments of the present disclosure are not limited to the dual-band GPS antenna in the above embodiment, but also applicable to any other dual-band or multi-band antenna suitable for implementation.

For example, in some embodiments, a dual-band or multi-band slot antenna for GPS and Bluetooth multiplexing, GPS and 4G LTE multiplexing, Bluetooth and 4G/5G multiplexing, or 4G and 5G multiplexing can be realized according to the implementations of the above description, and the type of the antenna is not limited to the examples or embodiments described in the present disclosure.

In some other embodiments, the structure of the slot antenna in the apparatus of the present disclosure is not limited to the embodiments shown above.

Figure 11:
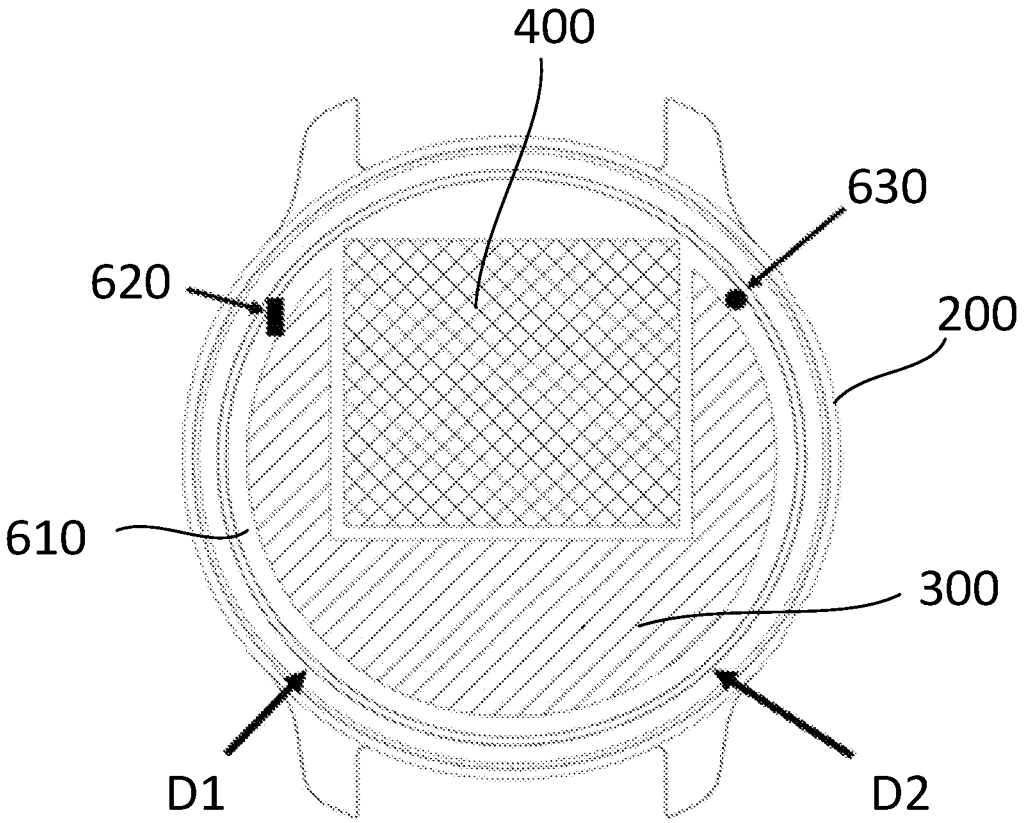
FIG. 11 is a schematic structural diagram illustrating an antenna according to another embodiment of the present disclosure.
Figure 12:
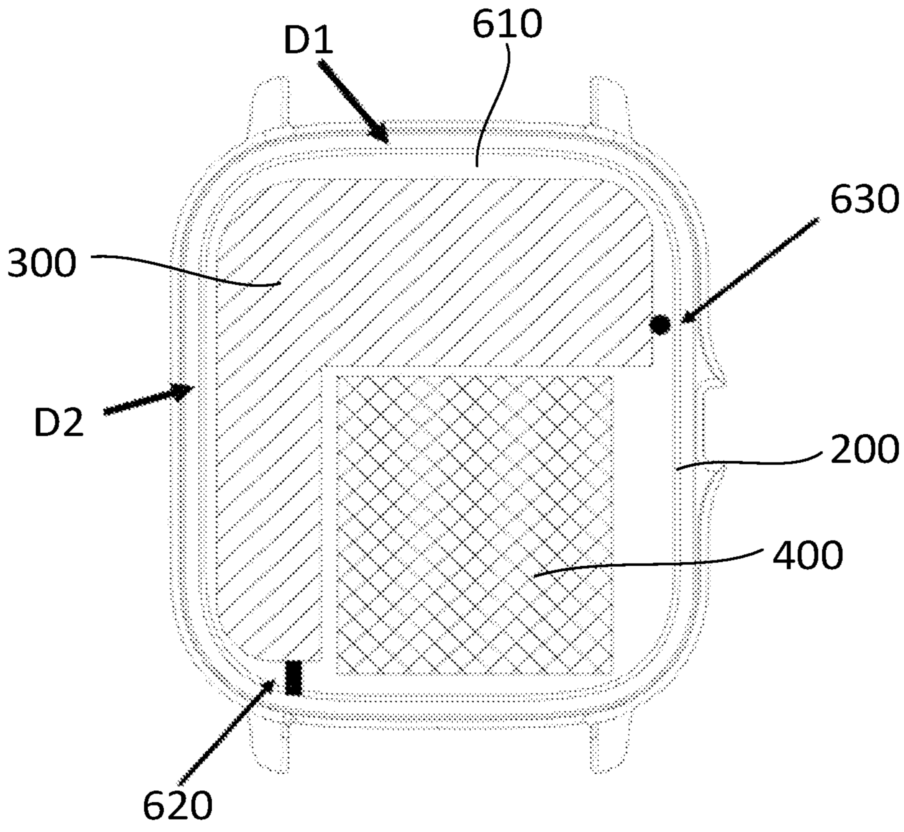
FIG. 12 is a schematic structural diagram illustrating an antenna according to yet another embodiment of the present disclosure.

For example, in some examples, the apparatus in the present disclosure includes a mainboard and a first conductor, the first conductor being arranged opposite to the mainboard, such that a gap between the first conductor and the mainboard forms a radiation slot. That is, as shown in FIG. 1, the first conductor is the conductive metal middle frame 200, and the annular slot 610 is formed by the gap between the mainboard 300, which has a complete roundish shape in FIG. 1, and the metal middle frame 200. In the embodiment shown in FIG. 11, the annular slot 610 can be formed by the mainboard 300, which has an incomplete shape in FIG. 11, and the metal middle frame 200. In the example in FIG. 12, the shape of the apparatus is not limited to a circle, but can be any other shape suitable for implementation, such as a rounded rectangle. This is not limited in the present disclosure, and can be understood and implemented by those skilled in the art based on the foregoing embodiments, which will not be repeated in the present disclosure.

For example, in some other examples, the apparatus in the present disclosure can include a second conductor electrically connected to the grounding unit, and the slot is provided on the second conductor. In particular, the second conductor can be an a conductive housing, such as, for example, all-metal housing of the watch, according to which an outer middle frame and the bottom case of the watch are made of metal materials of the conductor, and the metal housing is electrically connected to the grounding unit of the mainboard, such that the housing is equivalent to the ground. The radiation slot of the slot antenna is provided on the housing, (e.g., around the middle frame of the watch), such that the slot antenna structure of the present disclosure can also be realized. The implementation of the antenna structure in this example is the same as the foregoing, which can be understood and implemented by those skilled in the art, and will not be repeated in the present disclosure.

As can be seen from the foregoing, with the apparatus according to the embodiments of the present disclosure, the first inductor and the first capacitor are used to adjust the multiple orders of resonant frequencies of the slot antenna, such that the slot antenna having multiple available frequency bands is realized with a same antenna structure, and thus the multi-band slot antenna is realized.

In the apparatus according to some embodiments of the present disclosure, the operating frequencies of the slot antenna can include the first resonant frequency and the second resonant frequency, where the first resonant frequency is the second-order resonant frequency for realizing the L5 radiation frequency band of the GPS, and the second resonant frequency is the third-order resonant frequency for realizing the L1 radiation frequency band of the GPS. The dual-band GPS antenna can be realized with the third-order resonant frequency and the second-order resonant frequency having a frequency multiplication relationship close to that between the L1 and L5 frequency bands of the GPS, which is more conducive to the adjustment of the resonant frequencies of the antenna and simplifies the design process.

In the apparatus according to the embodiments of the present disclosure, the operating frequencies of the slot antenna further include the third resonant frequency, where the third resonant frequency is the fourth-order resonant frequency for realizing the radiation frequency band of the Bluetooth/WiFi antenna. The frequency multiplication relationship between the L5 frequency band of the GPS and the Bluetooth/WiFi frequency band is closer to the frequency multiplication relationship between the first resonant frequency and the third resonant frequency, thus the Bluetooth/WiFi frequency band is realized with the third resonant frequency. That is, the dual-band GPS antenna and Bluetooth/WiFi antenna are both realized with a same antenna structure without providing an additional Bluetooth/WiFi antenna, which simplifies the internal structure of the apparatus.

In the apparatus according to the embodiments of the present disclosure, the operating frequencies of the slot antenna include two orders of resonant frequencies, and the first capacitor is located at a position where a voltage value is zero at one order of the resonant frequencies and a voltage value is nonzero at the other order of the resonant frequencies, such that one order of the resonant frequencies can be independently adjusted with the first capacitor without affecting the other order of the resonant frequencies. Moreover, under the action of the first capacitor, one order of the resonant frequencies is independently adjusted through the inductance value of the first inductor, which is more conducive to the design of the dual-band antenna.

According to the apparatus in the embodiments of the present disclosure, when the apparatus is a mobile terminal, the radiation slot of the slot antenna can be realized either by using a mainboard and a metal middle frame of the terminal, or by using a gap on a metal housing, so as to provide more design options for antenna design of terminals with metal housings.

In some aspects, the techniques described herein relate to an apparatus with a slot antenna, including: a radiation slot formed in the apparatus; a feeding terminal, the feeding terminal having one end connected to a feeding point of the slot antenna across the radiation slot, and the other end electrically connected to a radio-frequency circuit of the apparatus; a first inductor, the first inductor having one end connected to a grounding point of the slot antenna across the radiation slot, and the other end electrically connected to a grounding unit of the apparatus; and a first capacitor provided in the radiation slot and having two electrodes respectively connected to both ends of the radiation slot in a width direction, wherein the first capacitor is located between the feeding terminal and the first inductor in a length direction of the radiation slot.

In some aspects, the techniques described herein relate to an apparatus, wherein an operating frequency of the slot antenna includes at least two orders of resonant frequencies, and the first capacitor and the first inductor are configured to adjust at least one order of resonant frequency of the operating frequency.

In some aspects, the techniques described herein relate to an apparatus, wherein an operating frequency of the slot antenna includes a first resonant frequency and a second resonant frequency, wherein the first resonant frequency is a second-order resonant frequency of the slot antenna, and the second resonant frequency is a third-order resonant frequency of the slot antenna.

In some aspects, the techniques described herein relate to an apparatus, wherein the operating frequency of the slot antenna further includes a third resonant frequency, a frequency band of the third resonant frequency including an operating frequency band adapted for Bluetooth or Wifi communications.

In some aspects, the techniques described herein relate to an apparatus, wherein an operating frequency of the slot antenna includes a first resonant frequency and a second resonant frequency, wherein a frequency band of the first resonant frequency includes an L5 frequency band of a GPS satellite positioning system, and a frequency band of the second resonant frequency includes an L1 frequency band of the GPS satellite positioning system.

In some aspects, the radiation slot is an annular slot, and the first resonant mode and the second resonant mode are both associated with an entire length of the annular slot.

In some aspects, the techniques described herein relate to an apparatus, wherein the operating frequency of the slot antenna further includes a third resonant frequency, a frequency band of the third resonant frequency including an operating frequency band adapted for Bluetooth or Wifi communications.

In some aspects, the techniques described herein relate to an apparatus, wherein the first resonant frequency and the second resonant frequency have a frequency multiplication relationship close to that between the L1 and L5 frequency bands of the GPS.

In some aspects, the techniques described herein relate to an apparatus, wherein an operating frequency of the slot antenna includes two orders of resonant frequencies, and the first capacitor is located at a position where a voltage value at one order of resonant frequency is zero and a voltage value at the other order of resonant frequency is nonzero in the length direction of the radiation slot.

In some aspects, the techniques described herein relate to an apparatus, wherein an operating frequency of the slot antenna includes two orders of resonant frequencies, and one of the two orders of resonant frequencies can be adjusted with the first capacitor without affecting the other one of the two orders of resonant frequencies.

In some aspects, the techniques described herein relate to an apparatus, wherein an operating frequency of the slot antenna includes two orders of resonant frequencies, and one of the two orders of resonant frequencies can be independently adjusted through at least one of the inductance value of the first inductor or a location of the first inductor.

In some aspects, the techniques described herein relate to an apparatus, wherein the slot antenna is a half-wavelength slot antenna.

In some aspects, the techniques described herein relate to an apparatus, further including: a mainboard, the mainboard including the grounding unit and the radio-frequency circuit.

In some aspects, the techniques described herein relate to an apparatus, further including: a first conductor arranged opposite to the mainboard, wherein the radiation slot is formed a gap between the first conductor and the mainboard.

In some aspects, the techniques described herein relate to an apparatus, wherein the apparatus includes: a conductive middle frame, wherein the first conductor includes at least a part of the conductive middle frame, and is arranged around an outer side of the mainboard.

In some aspects, the techniques described herein relate to an apparatus, further including: a housing having a conductive portion and an insulating portion, wherein the first conductor includes at least a part of the conductive portion.

In some aspects, the techniques described herein relate to an apparatus, wherein the housing includes a middle frame and an insulating bottom cover, and the conductive portion is attached to a surface of the middle frame.

In some aspects, the techniques described herein relate to an apparatus, further including: a second conductor electrically connected to the grounding unit, the radiation slot being provided on the second conductor.

In some aspects, the techniques described herein relate to an apparatus, wherein the apparatus includes: a conductive housing, wherein at least a part of the conductive housing forms the second conductor, the mainboard is provided inside the conductive housing, and a grounding unit of the mainboard is electrically connected to the conductive housing.

In some aspects, the techniques described herein relate to an apparatus, wherein the conductive housing includes a conductive middle frame and a conductive bottom case, and the radiation slot is provided on the conductive middle frame.

In some aspects, the techniques described herein relate to an apparatus, wherein the apparatus includes a wrist-worn device.

It is apparent that the above embodiments are merely examples for clarity of illustration, and are not limitations on the embodiments. For those ordinary skilled in the art, other variations or modifications in different forms can be made based on the above description. It is not necessary or possible to exhaust all embodiments herein. However, obvious variations or modifications derived therefrom still fall within the protection scope of the present disclosure.

What is claimed is:

1. An apparatus with a slot antenna, comprising:

a mainboard comprising a grounding unit and a radio-frequency circuit;

a first conductor, wherein an annular radiation slot is formed by a gap between the first conductor and the mainboard;

a feeding terminal, the feeding terminal having a first end connected to a feeding point of the first conductor a second end electrically connected to the radio-frequency circuit of the mainboard;

a first inductor, the first inductor having a first end connected to a grounding point of the first conductor, and a second end electrically connected to the grounding unit of the mainboard; and a first capacitor provided in the radiation slot and having two electrodes respectively connected to both ends of the radiation slot in a width direction of the radiation slot, wherein the first capacitor is located between the feeding terminal and the first inductor in a length direction of the radiation slot;

wherein an operating frequency of the slot antenna comprises a resonant frequency band of each of at least two resonant modes of the annular radiation slot.

2. The apparatus according to claim 1, wherein by positioning of at least one of the first capacitor or the first inductor at a selected location along the radiation slot, a resonant frequency band of a resonance mode is independently adjusted without affecting another resonance mode.

3. The apparatus according to claim 1, wherein an operating frequency of the slot antenna comprises a resonant frequency band of a first resonant mode and a resonant frequency band of a second resonant mode, the first capacitor is configured to adjust the resonant frequency band of the first resonance mode without affecting the second resonance mode, and the first inductor is configured to adjust the resonant frequency band of the second resonance mode without affecting the first resonance mode.

4. The apparatus according to claim 1, wherein a first portion of the radiation slot between the feeding terminal and the first inductor is longer than a second portion of the radiation slot between the feeding terminal and the first inductor, and the first capacitor is located in the first portion.

5. The apparatus according to claim 1, wherein an operating frequency of the slot antenna comprises a resonant frequency band of a first resonant mode and a resonant frequency band of a second resonant mode, the resonant frequency band of the first resonant mode comprising an L5 frequency band of a GPS satellite positioning system, and the resonant frequency band of the second resonant mode comprising an L1 frequency band of the GPS satellite positioning system.

6. The apparatus according to claim 5, wherein the operating frequency of the slot antenna further comprises a resonant frequency band of a third resonant mode, the resonant frequency band of the third resonant mode comprising an operating frequency band adapted for Bluetooth or Wifi communications.

7. The apparatus according to claim 5, wherein an original resonant frequency band of the first resonant mode and an original resonant frequency band of the second resonant mode have a frequency multiplication relationship close to that between the L1 and L5 frequency bands of the GPS satellite positioning system.

8. The apparatus according to claim 1, wherein the first capacitor is located at a position along the length direction of the radiation slot where a voltage value for a resonant mode is zero and a voltage value for another resonant mode is nonzero.

9. The apparatus according to claim 1, wherein the slot antenna is a half-wavelength slot antenna.

10. The apparatus according to claim 1, wherein an operating frequency of the slot antenna comprises a resonant frequency band of a first resonant mode and a resonant frequency band of a second resonant mode, wherein the first resonant mode is a second-order resonant of the slot antenna, and the second resonant mode is a third-order resonant of the slot antenna.

11. The apparatus according to claim 1, wherein the apparatus comprises:

a conductive middle frame, wherein the first conductor comprises at least a part of the conductive middle frame, and is arranged around an outer side of the mainboard.

12. The apparatus according to claim 1, further comprising:

a housing having a conductive portion and an insulating portion, wherein the first conductor comprises at least a part of the conductive portion.

13. The apparatus according to claim 12, wherein the housing comprises a middle frame and an insulating bottom cover, and the conductive portion is attached to a surface of the middle frame.

14. The apparatus according to claim 1, wherein the apparatus comprises a wrist-worn device.

15. An apparatus with a slot antenna, comprising:

a radiation slot formed in the apparatus;

a feeding terminal, the feeding terminal having a first end connected to a feeding point of the slot antenna, and a second end electrically connected to a radio-frequency circuit of the apparatus;

a first inductor, the first inductor having a first end connected to a grounding point of the slot antenna, and a second end electrically connected to a grounding unit of the apparatus; and a first capacitor provided in the radiation slot and having two electrodes respectively connected to both ends of the radiation slot in a width direction of the radiation slot, wherein the first capacitor is located between the feeding terminal and the first inductor in a length direction of the radiation slot, wherein an operating frequency of the slot antenna comprises a resonant frequency band of a first resonant mode and a resonant frequency band of a second resonant mode, the first capacitor is configured to adjust the resonant frequency band of the first resonance mode without affecting the second resonance mode, and the first inductor is configured to adjust the resonant frequency band of the second resonance mode without affecting the first resonance mode.

16. The apparatus according to claim 15, wherein a first portion of the radiation slot between the feeding terminal and the first inductor is longer than a second portion of the radiation slot between the feeding terminal and the first inductor, and the first capacitor is located in the first portion.

17. The apparatus according to claim 15, wherein the resonant frequency band of the first resonant mode comprising an L5 frequency band of a GPS satellite positioning system, and the resonant frequency band of the second resonant mode comprising an L1 frequency band of the GPS satellite positioning system.

18. The apparatus according to claim 17, wherein the radiation slot is an annular slot, and the first resonant mode and the second resonant mode are both associated with an entire length of the annular slot.

19. The apparatus according to claim 15, further comprising:

a mainboard; and a first conductor arranged opposite to the mainboard, wherein the radiation slot is formed by a gap between the first conductor and the mainboard.

20. The apparatus according to claim 19, further comprising:

a second conductor electrically connected to the mainboard, wherein the radiation slot is provided on the second conductor.

* * * * *